(12) United States Patent
Kwan et al.

(10) Patent No.: US 11,474,076 B2
(45) Date of Patent: Oct. 18, 2022

(54) ACOUSTIC MODEL ACOUSTIC REGION OF INFLUENCE GENERATION

(71) Applicant: Olympus NDT Canada Inc., Québec (CA)

(72) Inventors: Chi-Hang Kwan, Quebec (CA); Nicolas Badeau, Quebec (CA); Benoit Lepage, Quebec (CA); Guillaume Painchaud-April, L'Ancienne-Lorette (CA)

(73) Assignee: Olympus NDT Canada Inc., Québec (CA)

( * ) Notice: Subject to any disclaimer, the term of this patent is extended or adjusted under 35 U.S.C. 154(b) by 431 days.

(21) Appl. No.: 16/799,022

(22) Filed: Feb. 24, 2020

(65) Prior Publication Data
US 2020/0278323 A1 Sep. 3, 2020

Related U.S. Application Data

(60) Provisional application No. 62/812,199, filed on Feb. 28, 2019.

(51) Int. Cl.
*G01S 15/00* (2020.01)
*G01N 29/06* (2006.01)
(Continued)

(52) U.S. Cl.
CPC ....... *G01N 29/0672* (2013.01); *G01N 29/069* (2013.01); *G01N 29/262* (2013.01);
(Continued)

(58) Field of Classification Search
USPC .......................................... 700/30
See application file for complete search history.

(56) References Cited

U.S. PATENT DOCUMENTS 8,360,980 B2 * 1/2013 Kamiyama ............ A61B 8/481
600/458
8,454,515 B2 * 6/2013 Kamiyama .............. A61B 8/06
600/444
(Continued)

FOREIGN PATENT DOCUMENTS

CN 103543200 B 1/2014
DE 102016225979 A1 6/2018
(Continued)

OTHER PUBLICATIONS

Sy, Kom Bosse, et al., "Development of the specular echoes estimator to predict relevant modes for Total Focusing Method imaging", NDT and E International 99, (2018), 134-140.
(Continued)

*Primary Examiner* — James R Hulka
(74) *Attorney, Agent, or Firm* — Schwegman Lundberg & Woessner, P.A.

(57) ABSTRACT

Systems and methods are disclosed for conducting an ultrasonic-based inspection. The systems and methods perform operations comprising: receiving a plurality of scan plan parameters associated with generating an image of at least one flaw within a specimen based on acoustic echo data obtained using full matrix capture (FMC); applying the plurality of scan plan parameters to an acoustic model, the acoustic model configured to determine a two-way pressure response of a plurality of inspection modes based on specular reflection and diffraction phenomena; generating, by the acoustic model based on the plurality of scan plan parameters, an acoustic region of influence (AROI) comprising an acoustic amplitude sensitivity map for a first inspection mode amongst the plurality of inspection modes; and generating, for display, a first image comprising the AROI
(Continued)

associated with the first inspection mode for capturing or inspecting the image of the at least one flaw.

22 Claims, 12 Drawing Sheets

(51) Int. Cl.
*G01S 7/52* (2006.01)
*G01S 15/89* (2006.01)
*G01N 29/44* (2006.01)
*G01N 29/46* (2006.01)
*G01N 29/26* (2006.01)

(52) U.S. Cl.
CPC ..... *G01N 29/4418* (2013.01); *G01N 29/4472* (2013.01); *G01N 29/46* (2013.01); *G01S 7/52036* (2013.01); *G01S 15/006* (2013.01); *G01S 15/89* (2013.01)

(56) References Cited

U.S. PATENT DOCUMENTS

| | | | |
|---|---|---|---|
| 8,738,339 B2 | 5/2014 | Richard et al. | |
| 8,909,492 B2 | 12/2014 | Mckeon | |
| 9,625,424 B2 | 4/2017 | Lepage et al. | |
| 9,846,224 B2 | 12/2017 | Bredif et al. | |
| 10,101,304 B2* | 10/2018 | Zhang | G01N 29/4427 |
| 10,921,293 B2* | 2/2021 | Bredif | G01H 5/00 |
| 2002/0151798 A1* | 10/2002 | Honda | A61B 8/481 600/458 |
| 2004/0215076 A1* | 10/2004 | Kamiyama | A61B 8/481 600/443 |
| 2004/0267128 A1* | 12/2004 | Matsumura | A61B 8/481 600/458 |
| 2005/0203406 A1* | 9/2005 | Kamiyama | A61B 8/13 600/458 |
| 2008/0058646 A1* | 3/2008 | Kamiyama | G01S 15/8979 600/447 |
| 2009/0082670 A1* | 3/2009 | Kamiyama | A61B 8/06 600/459 |
| 2011/0004097 A1* | 1/2011 | Kamiyama | A61B 8/06 600/431 |
| 2015/0377840 A1 | 12/2015 | Zhang et al. | |
| 2016/0238566 A1 | 8/2016 | Lepage et al. | |
| 2017/0082582 A1 | 3/2017 | Fendt et al. | |
| 2018/0180578 A1 | 6/2018 | Habermehl et al. | |
| 2019/0234909 A1 | 8/2019 | Bredif et al. | |

FOREIGN PATENT DOCUMENTS

| | | | |
|---|---|---|---|
| EP | 2401606 B1 | | 8/2018 |
| JP | 2006305160 A | * | 11/2006 |
| JP | 2013078675 A | * | 5/2013 |
| WO | WO-2018069321 A1 | | 4/2018 |

OTHER PUBLICATIONS

"Advanced PA UT Probes for TOPAZ 64", Zetec Inc., (Mar. 2020), 18 pgs.

"Applications of TOPAZ32 Portable Phased Array System for Truly Efficient Inspections", Zetec Inc., (2016), 14 pgs.

"TOPAZ 16 Brochure", Zetec Inc., (2020), 6 pgs.

"International Application Serial No. PCT/CA2020/050245, Written Opinion dated May 7, 2020", 4 pgs.

"International Application Serial No. PCT/CA2020/050245, Third Party Observation dated Dec. 16, 2020", 3 pgs.

"International Application Serial No. PCT/CA2020/050245, Third Party Observation dated Dec. 16, 2020", 13 pgs.

"International Application Serial No. PCT/CA2020/050245, International Search Report dated May 7, 2020", 3 pgs.

Budyn, Nicolas, et al., "Sensitivity images for multi-view ultrasonic array inspection", AIP Conference Proceedings 1949, (2018), 080001-1-080001-6.

Holmes, Caroline, et al., "Post-processing of the full matrix of ultrasonic transmit-receive array data for non-destructive evaluation", NDT&E International 38, (2005), 701-711.

Nikolov, S I, et al., "Practical applications of synthetic aperture imaging", 2010 IEEE International Ultrasonics Symposium, (2010), 350-358.

Schmerr Jr., Lester, "Chapters 4.5, 10.1 and 10.2", Fundamentals of Ultrasonic Nondestructive Evaluation—A Modeling Approach, Springer, Second Edition, (2016), 34 pgs.

Stratoudaki, Theodosia, et al., "Laser induced ultrasonic phased array using full matrix capture data acquisition and total focusing method", Optics Express 21937, vol. 24, No. 19, (2016), 18 pgs.

Sy, Kombosse, et al., "Development of methods for the analysis of multi-mode TFM images", J. Phys. Conf. Ser., vol. 1017, (2018), 10 pgs.

"European Application Serial No. 20762590.6, Response Filed Mar. 22, 2022 to Communication pursuant to Rules 161(2) and 162 EPC dated Oct. 5, 2021", 10 pgs.

"International Application Serial No. PCT CA2020 050245, International Preliminary Report on Patentability dated Sep. 10, 2021", 9 pgs.

* cited by examiner

ACOUSTIC MODEL ACOUSTIC REGION OF INFLUENCE GENERATION

CLAIM FOR PRIORITY

This application claims the benefit of priority to U.S. Provisional Application No. 62/812,199, filed Feb. 28, 2019, which is herein incorporated by reference in its entirety.

TECHNICAL FIELD

The present disclosure generally relates to a method and a system for conducting non-destructive testing/inspection (later as NDT/NDI).

BACKGROUND

Phased array ultrasonic testing (PAUT) is an advanced method of ultrasonic testing (UT) that has applications in industrial non-destructive testing (NDT). The Total Focusing Method (TFM) is a synthetic aperture beam forming technique that has been under active development in the NDT industry over the past decade. Common applications of these techniques are to find flaws in manufactured materials such as welds.

Single-element (non-phased array) probes, known technically as monolithic probes, emit a beam in a fixed direction. To test a large volume of material, a conventional probe must be physically moved or turned to sweep the scan beam through the area of interest.

In contrast, the beam from a PAUT probe can be moved electronically, without moving the probe, and can be swept through a wide volume of material at high speed. The beam is controllable because a PAUT probe is made up of multiple small elements, each of which can be pulsed individually at a computer-calculated timing, forming incidence angles. The term phased refers to the timing, and the term array refers to the multiple elements. A beam can be defined by a corresponding aperture; where the aperture can be defined by a portion or all of the elements of the PAUT probe.

During typical inspections of welds, multiple ultrasound beams are generated to define a single aperture or multiple apertures corresponding to various incidence angles. Acoustic scatterings from acoustic transmissions can be used to generate an image showing reflections (or diffractions) of the ultrasonic waves that are associated to defects within the scanned area in the test object. For weld inspection, the region of interest, or the scanned area, generally encompasses the weld and its surrounding area. For cases where the aperture is fixed and only the angles are changed, the images are called a sectoral scan or S-scan. For cases where the angle is fixed and only the aperture is moved, the images are called a linear scan or E-scan.

According to an international code "2010 ASME Boiler & Pressure Vessel Code, 2010 Edition, Section V—Nondestructive Examination" (Herein after as "codes"), the definition of the inspection scan plan associated to weld inspection relies on the combination of a) instrumentation configuration including probe, wedge, and acquisition unit; b) acoustic setting, including, aperture size and position, focalization setting, beams angle, gating parameters and c) probe manipulation guideline, including probe to weld distance, maximum inspection speed.

Overview

In some implementations, a method is provided for conducting an ultrasonic-based inspection, such as providing assistance and automation to an ultrasonic scan plan and setup generation. The systems and methods perform operations comprising: receiving a plurality of scan plan parameters associated with generating an image of at least one flaw within a specimen based on acoustic echo data obtained using full matrix capture (FMC); applying the plurality of scan plan parameters to an acoustic model, the acoustic model configured to determine a two-way pressure or stress response of a plurality of inspection modes based on specular reflection and diffraction phenomena; generating, by the acoustic model based on the plurality of scan plan parameters, an acoustic region of influence (AROI) comprising an acoustic amplitude sensitivity map for a first inspection mode amongst the plurality of inspection modes; and generating, for display, a first image comprising the AROI associated with the first inspection mode for capturing or inspecting the image of the at least one flaw.

The disclosure is generally discussed with a specific application to TFM and/or FMC acquisition schemes. Similar techniques can be applied to other types of image acquisitions and/or other types of imaging, such as acquisition in plane waves (e.g., limited amount of massive insonifaction in transmission, and many elementary receptions) that do not result in TFM using the elementary A-Scans.

The above overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example but not by way of limitation, various implementations discussed in the present document.

DETAILED DESCRIPTION

Figure 1:
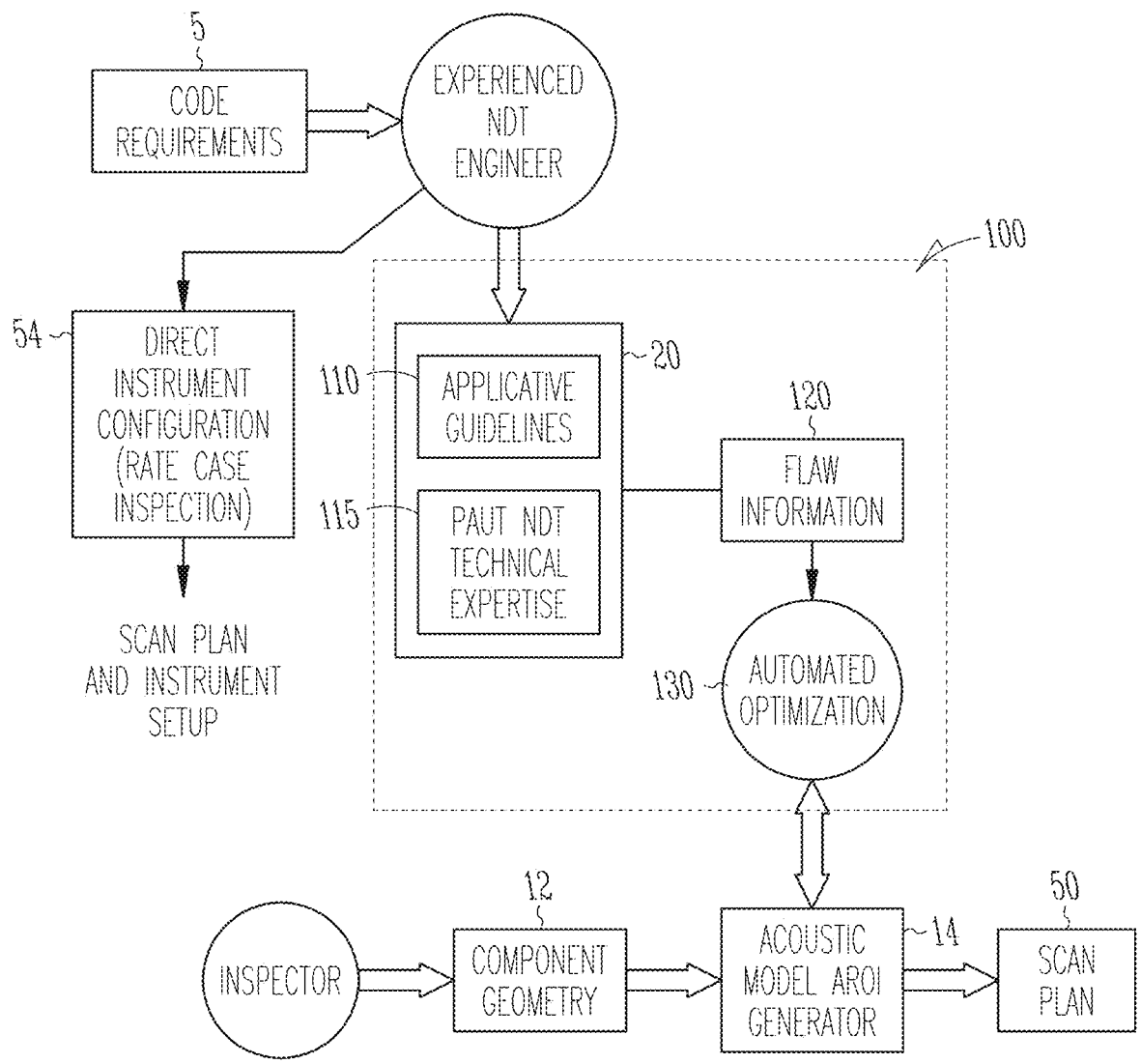
FIG. 1 illustrates an illustrative scan plan generation and inspection process, according to some implementations of the present disclosure.

In the following detailed description, reference is made to the accompanying drawings which faun a part hereof, and which is shown by way of illustration-specific implementations in which the present disclosure may be practiced. These implementations, which are also referred to herein as "examples," are described in sufficient detail to enable those skilled in the art to practice the disclosure, and it is to be understood that the implementations may be combined, or that other implementations may be utilized and that structural, logical and electrical changes may be made without departing from the scope of the present disclosure. The following detailed description is, therefore, not be taken in a limiting sense, and the scope of the present disclosure is defined by the appended claims and their equivalents.

By applying appropriate transmission and reception delays to A-scan data collected in a Full Matrix Capture (FMC) dataset, TFM can electronically focus on every location within an inspection region. Since every point is electronically focused, TFM can provide better resolution compared to conventional phased array ultrasound inspection techniques. In addition, by calculating and applying the time of flights of multiple acoustic modes, multi-mode TFM can be performed which can provide additional information about the specimen being inspected. Despite these advantages, TFM also has limitations governed by physical laws. An inspection area may have poor sensitivity due to the effects of interface interaction, beam forming limitations and propagation path attenuation. Owing to the complexity of multi-mode TFM imaging, inspectors spend a great deal of time and resources trying to define an optimal scan plan that maximizes the Signal-to-Noise Ratio (SNR) and probability of detection.

In addition, for inspection in pulse echo, the existing practice is based on simple ray tracing with direct evaluation of the perpendicularity of the so-called beams with the bevel. Whereas this is suitable for pulse-echo, similar simplistic models and techniques cannot be equally or easily applied to acoustic imaging that relies on more complex acoustic (such as that permitted by TFM).

Also, a recurring problem associated to weld inspection using phased array ultrasonic scans and TFM is that the combination of parameters that define the scan plan gets extremely complicated. Particularly, all the parameters in the scan plan could have vast range of selections which need to be tailored to the particular specimen under consideration and the particular flaw being targeted. It is extremely difficult to have an individual trained in such a broad range of expertise as in phased array systems, phased array probes and wedges and in weld structure and flaws. In a typical scenario, a scan plan for TFM is created by setting the attributes for the various parameters according to the specimen and flaw under consideration. The scan plan is then executed by performing an inspection of the specimen using a probe based on the scan plan parameters. The inspection of the specimen produces an image of the flaw which is then analyzed. If any one of the parameters in the scan plan is not initially accurately set, the entire inspection may be flawed and may need to be re-performed using a different set of scan plan parameters. This introduces various inefficiencies, wastes time and resources associated with performing TFM based inspections. Accordingly, there remains a challenge to configure an optimal scan plan with ranges of parameters for all the factors listed above.

The present disclosure includes various techniques to improve and enhance the way in which scan plans are conducted including how the scan plans are created, executed for inspecting a specimen, and the way in which results of inspections performed according to a given scan plan are evaluated. Specifically, the present disclosure provides an acoustic model that is configured to determine a two-way pressure response of a plurality of inspection modes based on specular reflection and diffraction phenomena. A trained individual can input a plurality of scan plan parameters into the acoustic model. The output of the acoustic model includes an acoustic region of influence (AROI) image that represents an amplitude sensitivity map for one or more inspection modes in relation with a target flaw. The trained individual can analyze the AROI and make one or more adjustments to ensure that the results of the scan plan accurately capture the flaw of interest. Once the scan plan parameters are set based on the output of the acoustic model, an inspector can execute the scan plan and perform an inspection of the specimen.

In some cases, the inspector is provided with a portable tool or portable probe that itself implements or has access to the acoustic model. The inspector can input the scan plan parameters and/or adjust the scan plan parameters of the portable tool or portable probe and is presented with a simulated output of the AROI. This way, the inspector can, in real-time, view and/or make adjustments to the scan plan as the inspector is executing the scan plan to perform the inspection of the specimen.

In some cases, an analysis of an executed scan plan can include a comparison of the inspection images with one or more images of the output of the acoustic model. For example, the SNR of an inspection image can be evaluated independently and the AROI map output by the acoustic model can help explain why the SNR is good or poor and possibly suggest a different mode or parameters for a subsequent inspection if the SNR is inadequate or fails to satisfy one or more criteria.

In some cases, a collection of simulated images, each associated with a different set of scan plan parameters (e.g., different inspection modes) can be aggregated and combined into a single image. This enables a user to determine scan plan parameters that result in the maximum SNR. In some implementations, an automated system is provided that automatically generates a scan plan or suggests or selects one or more parameters of the scan plan for a TFM inspection based on one or more scan plan parameters that are input. To automatically generate the one or more parameters of the scan plan, the acoustic model solves an optimization problem that considers various scan plan parameters and flaw types.

Referring to FIG. 1, the present disclosure, herein referred to as a scan plan generator 100, is comprised of: applicative guidelines 110, a PAUT NDT or TFM technical expertise 115, flaw information 120, and an automated optimization process 130. Applicative guidelines 110 and expertise 115 together form a scan plan generating module 20.

The objective of scan plan generator 100 is to allow a user (e.g., a scan plan creator or inspector), who might have limited knowledge of PAUT NDT or TFM technical expertise 115 and/or code requirements 5, to generate a scan plan 50 and further a suitable instrumentation setup that corresponds to inspecting a test object or specimen with component geometry 12 according to code requirements 5. This is achieved by integrating PAUT NDT or TFM technical expertise 115 and the decomposition of code requirements 5 into a set of applicative guidelines 110, which encompass the typical aspects covered for the vast majority of inspections. Alternatively, special case inspections that go beyond the scope defined by applicative guidelines 110 can still be addressed through a direct instrument configuration 54 that corresponds to existing practice which necessitates direct involvement of the experienced NDT or TFM engineer for the scan plan generation.

Herein all components of the scan plan generator 100 are types of electronic memories and/or processing device, which can be discrete components or part of an integral device. In some cases, some or all of the components depicted as part of the scan plan generator 100 may be included in a portable testing unit or device. Such a portable testing unit or device can be used by an inspector to perform an inspection of a specimen according to TFM techniques and can present a simulated output of the scan plan parameters based on the acoustic model AROI generator 14.

Scan plan generator 100 makes it possible for scan plan generator module 20 to generate flaw information 120 based on inputs received from the NDT or TFM engineer through the settings of applicative guidelines 110, PAUT NDT or TFM technical expertise 115, and previously stored default settings that include some of PAUT NDT or TFM technical expertise 115 and 'best practices' from applicative guidelines 110. Automated optimization process 130 collaborates with (or is integrated into) the acoustic model AROI generator 14 to find a suitable solution for the application of the flaw information 120 on component geometry 12 to be specifically inspected.

Illustrative aspects of PAUT NDT or TFM technical expertise 115 that are set by the NDT or TFM engineer in flaw information 120 for generating scan plan 50 further include: a beam focalization information, a beam aperture information, a probe and wedge selection information, a preferred scanning method information, a range of refraction angles information, and an optimization rules and levels of priority information.

Probe and wedge selection is affected by the part's external diameter (OD), the wall thickness (WT), and by the weld orientation and geometry relative to the pipe. For example, a first geometry can be a girth weld between two pipes (typically defined in the art as an AOD inspection), a second geometry can be a longitudinal weld along the pipe axis (defined in the art as an COD inspection), a third geometry can be a complex weld at the junction of two pipes. For a given flaw in flaw information 120, the NDT or TFM engineer can maintain a table that associates probe and wedge selection with different wall thicknesses (WT) and external diameters (OD), and flaw type (e.g., side drill holes or flat bottom holes). The table can provide default values corresponding to the recommended practice for most applications.

Another aspect defining the TFM technical expertise is preferred scanning method technical expertise. TFM scanning methods include FMC, plane wave imaging, and virtual source imaging. PAUT scanning methods include the sectoral scan, or S-scan (defined by a preferred S-scanning method technical expertise 115), where the aperture is kept at a fixed position and the refraction angle is swept through a range of angles. Another PPAUT scanning method is the linear scan, or E-scan (defined by a preferred E-scanning method technical expertise 115), where the beam refraction angle is kept fixed and scanning is made by lateral movement of the selected probe aperture. Other scanning methods (inspection modes) include pulse echo mode, double-skip mode, or self-tandem mode. Within each of these scanning methods additional parameters, such as the wave sets can be selected. In some cases, certain pule echo scanning methods are replaced in TFM by one or more of longitudinal-longitudinal (LL), TT, and transverse-transverse-transverse-transverse (TTTT) wave sets and the self-tandem mode includes TTT, transverse-longitudinal-transverse (TLT), longitudinal-longitudinal-transverse (LLT), longitudinal-longitudinal-longitudinal (LLL), longitudinal-transverse-transverse (LTT), and transverse-transverse-longitudinal (TTL) wave sets. A given TFM scan plan includes a selection of one of these scanning methods and the specific wave set of the selected scanning method.

The NDT or TFM technical expertise can define optimization rules and/or levels of priority. Levels of priority between optimization rules deal with interferences between these rules. More specifically, for weld inspection with pulse echo PAUT or TFM, there are typically four different optimization rules. The first optimization rule is to reduce the number of separate probe passes that are required to cover an inspection area. The second optimization rule is to reduce the angular range be generated by the PAUT or TFM probe. The third optimization rule is to minimize the distance between the probe and the weld (ideally down to the minimum distance not leading to mechanical interferences, information that should be found in the definition of component geometry 12). The fourth optimization rule is to reduce the total number of beams that maximizes scan productivity, such as using FMC to partially fill a matrix including only required information to improve productivity. Based on these optimization rules and/or levels of priority, the acoustic model AROI generator 14 can process a set of inputs and solve an optimization problem to automatically generate and recommend a set of scan plan parameters that are determined to maximize the SNR of the flaw within a specimen. A fifth optimization rule for TFM is to reduce the number of pixels to process in order to increase productivity. A sixth optimization rule for TFM is to select which mode to process and where in the image the mode should process.

The acoustic model AROI generator 14 is developed using a combination of optics and acoustics models. Specifically, certain optical beam propagation models are adapted for application to acoustic signals and information. Similar equations of motion for optics (e.g., wave propagation equations) are used to generate the acoustic model with consideration of boundary conditions of a specimen. The main components of the AROI model include: wave propagation both in transmission and reception; interface interactions (transmission through interfaces and reflection from interfaces); flaw scattering (general diffraction approach); and application to phased-array systems. The acoustic model AROI generator 14 may include a ray-based acoustic model that calculates the two-way pressure response of pulse echo, self-tandem, and/or double-skip TFM inspection modes.

In some implementations, since the transmission and reception beams employed in phased array imaging typically have a well-defined propagation direction, in the acoustic model in the acoustic model AROI generator 14 makes use of the paraxial Fourier optics to describe the propagation of the acoustic beams. In the frequency domain, the paraxial wave equation for a pressure wave, for instance, has the form of Equation 1:

$$\frac{\partial^2 P}{\partial x^2} + \frac{\partial^2 P}{\partial y^2} + 2ik\frac{\partial P}{\partial z} = 0 \qquad (1)$$

In Equation (1), P is the pression, k is the propagation wavenumber and i the square root of −1. Attenuation effects can be modelled using a complex wavenumber. Equation (1) has solutions of the form of Equation 2:

$$p = P(x,y,z,\omega)\exp(ikz - i\omega t) \tag{2}$$

Equation (2) describes a "quasi" plane-wave which propagates in the z direction. Identical expressions can be derived for the velocity potentials which describe the propagation of longitudinal and transverse (shear) waves.

In some implementations, since the propagating acoustic beams are modeled as quasi plane-waves, the acoustic model makes use of geometrical optics to calculate the change in path of an acoustic beam as it crosses an interface. From Snell's law, the incident and refracted/reflected angles are related by a simple relationship defined by Equation 3:

$$\frac{\sin(\theta_2)}{\sin(\theta_1)} = \frac{c_2}{c_1} \tag{3}$$

Where in Equation (3), $c_1$ and $c_2$ are the speed of sound of the media in front of and behind the interface. In addition to changing the acoustic propagation path, an interface can also cause a step change in the amplitude of the propagated beam. The step change in beam amplitude for a paraxial beam can be calculated using plane-wave transmission/reflection coefficients. Plane-wave transmission/reflection coefficients can be readily derived by applying the appropriate physical boundary conditions.

In some implementations, the acoustic model employs Kirchhoff flaw scattering integral to calculate the far-field scattering coefficients for volumetric and crack-like flaws. Both diffraction and specular reflection and diffraction-like scattering responses can be obtained depending on the size of the defect.

In some implementations, to obtain an acoustic amplitude map that is consistent with the received voltage in a phased array inspection system, the acoustic mode sums the contributions from all combinations of transmitters and receivers. In addition, appropriate time delays consistent with the transmission and reception delay laws is applied. In equation format, this can be summarized as Equation 4:

$$\sum_{l}^{N_l} \sum_{m}^{N_m} A_l(t_l) A_m(t_m) S_{lm} \tag{4}$$

In Equation (4) l is an index corresponding to a count of transmitter elements $N_l$, and m is an index corresponding to a count of receiver elements $N_m$. A stands for the acoustic beam amplitude (at a given transmitter $A_l$ and at a given receiver $A_m$), t stands for the delays in transmission and reception and S stands for the defect scattering response.

In some implementations, a user (e.g., a scan planner) may use the acoustic model AROI generator 14 to assist the user in generating a scan plan. In such cases, the user may input one or more parameters of a scan plan (e.g., a type of flaw to be detected, a spatial extent of the flaw, a size of a reflector, a geometry of the reflector, an orientation of the reflector, a specimen material, an acoustic velocity within the specimen, a specimen thickness, a weld description comprising a weld bevel angle, a probe frequency, a count of elements, a pitch of acoustic transducer elements and elements geometry, separation distance and size of acoustic transducer elements, an acoustic transducer assembly wedge angle, an acoustic transducer assembly wedge material and/or an acoustic transducer assembly wedge geometry) into the acoustic model AROI generator 14. The user may also specify a first inspection mode (E.g., pulse echo mode, double-skip mode, or self-tandem mode) and one or more parameters of the specified inspection mode. The acoustic model AROI generator 14 may apply an acoustic model to the input parameters to generate an AROI that includes an acoustic amplitude sensitivity map for a first inspection mode amongst the plurality of inspection modes.

In some cases, the AROI is an acoustic amplitude sensitivity map for a given TFM inspection scan plan. In general, the AROI map differs for directional and non-directional flaw scatterers. NDT examples of non-directional scatterers include slag and porosity in welds; examples of directional scatterers include lack of fusion in welds and various cracks. The acoustic model implemented by the generator 14 takes into account the effects of transmission and reflection coefficients, geometric beam spread and material attenuation. In addition, the acoustic model also uses the Rayleigh-Sommerfeld integral to model the far-field scattering response for a Flat Bottom Hole (FBH) which may be used to simulate directional flaws.

Figure 2:
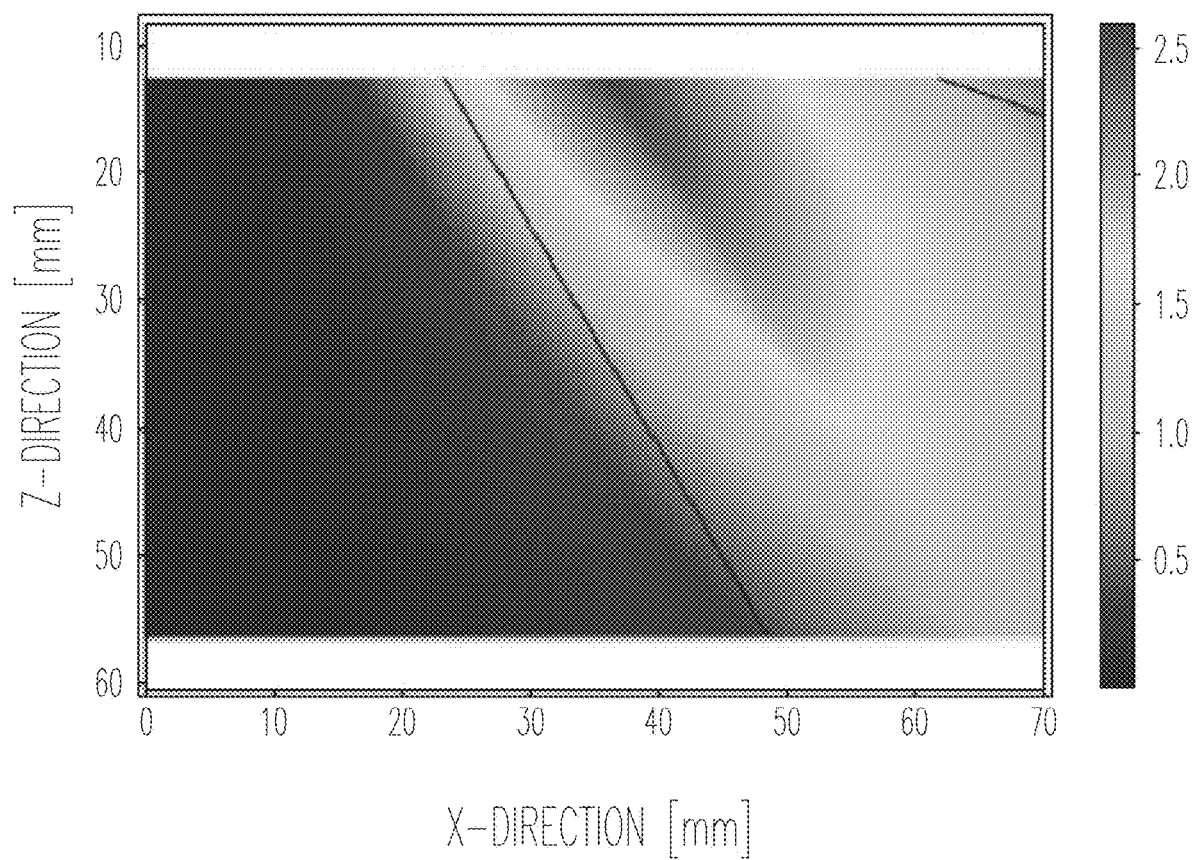
FIG. 2 is an illustrative output of the acoustic model for pulse-echo transverse-transverse (TT) mode, according to some implementations of the present disclosure.
Figure 3:
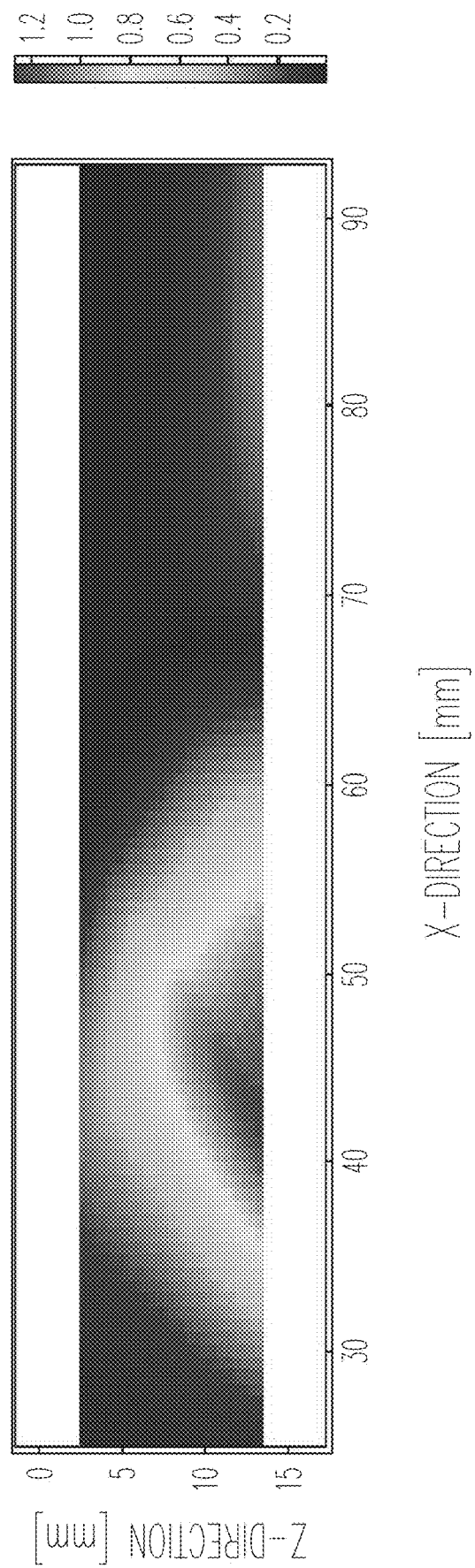
FIG. 3 is an illustrative output of the acoustic model for self-tandem transverse-transverse-transverse TTT mode, according to some implementations of the present disclosure.

The acoustic model AROI generator 14 presents to the user the AROI to the user to identify to the user a simulated result or image of an inspection of the specimen based on the input parameters. For example, the acoustic model AROI generator 14 may receive input from the user that specifies parameters for a scan plan including pulse-echo TT mode. In such cases, the acoustic model AROI generator 14 outputs a simulated image of the inspection that is illustrated in FIG. 2. The user can analyze the simulated results (e.g., the image shown in FIG. 2) and modify one or more parameters of the scan plan. Specifically, the image shown in FIG. 2 accurately predicts the area within the scan plan with the optimal sensitivity (e.g., by shading the area in a given color). For example, the user can modify the inspection mode to specify a second inspection mode and one or more parameters of the second inspection mode. The acoustic model AROI generator 14 can then generate, in real-time, a simulated inspection image of the revised parameters of the scan plan. Specifically, the user can change the inspection mode to be a self-tandem TTT mode. In response, the acoustic model AROI generator 14 presents a simulated image representing the scan plan parameters for the self-tandem TTT mode as illustrated in FIG. 3. In this way, the user can compare TFM acoustic sensitivities for different scan plans and for different acoustic modes.

Figure 4:
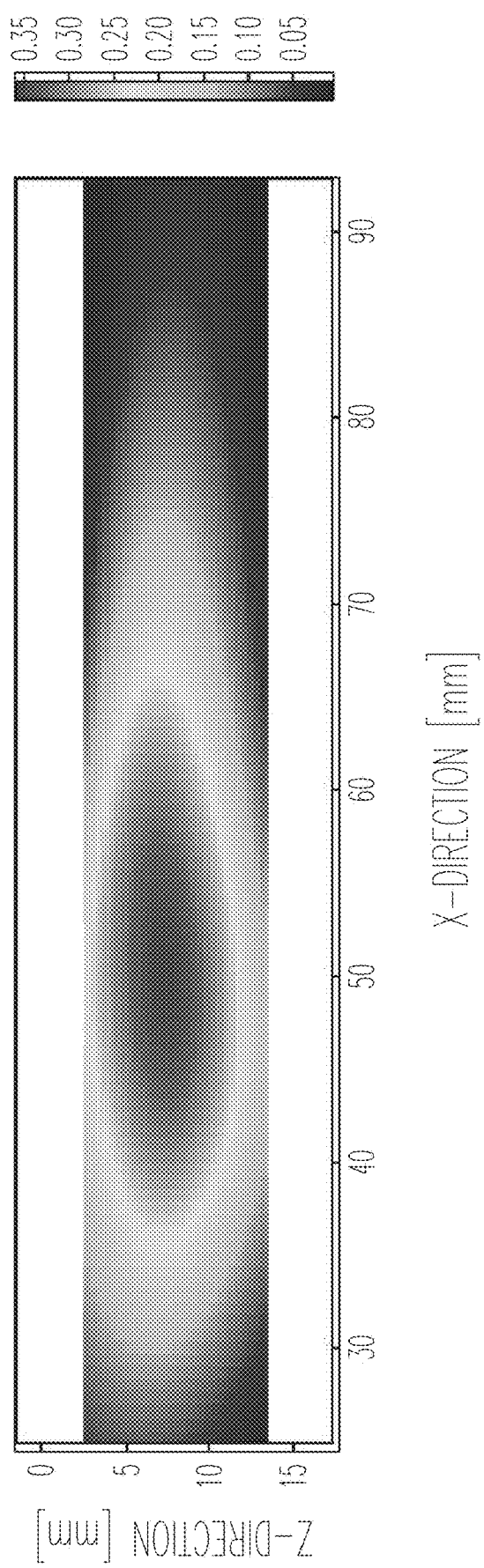
FIG. 4 is an illustrative output of the acoustic model for self-tandem TLT mode, according to some implementations of the present disclosure.

In some implementations, the user can then specify another inspection mode, such as the self-tandem TLT mode as part of the scan plan. In response, the acoustic model AROI generator 14 generates a simulated image, such as the image shown in FIG. 4 that represents a simulated output of the inspection when performed using the further revised scan plan parameters. After the user is satisfied that the most accurate scan plan parameters have been input, the user can select an option to generate and implement the scan plan for performing a TFM inspection. An instruction is sent to a field technician to perform the inspection of the specimen according to the selected scan plan parameters. After the field technician implements or performs the inspection according to the scan plan parameters, an inspection image is generated and provided as output for analysis.

In some cases, the field technician may use a portable device to perform the inspection of the specimen. The portable device may implement an instance of the acoustic model AROI generator 14. The portable device may present to the field technician the simulated output (e.g., an image) of the scan plan. The simulated output may be presented before, during, or after the technician performs the inspection. In some cases, the technician can make real-time modifications to the scan plan by analysing the simulated output image while performing the inspection of the specimen.

Figure 5:
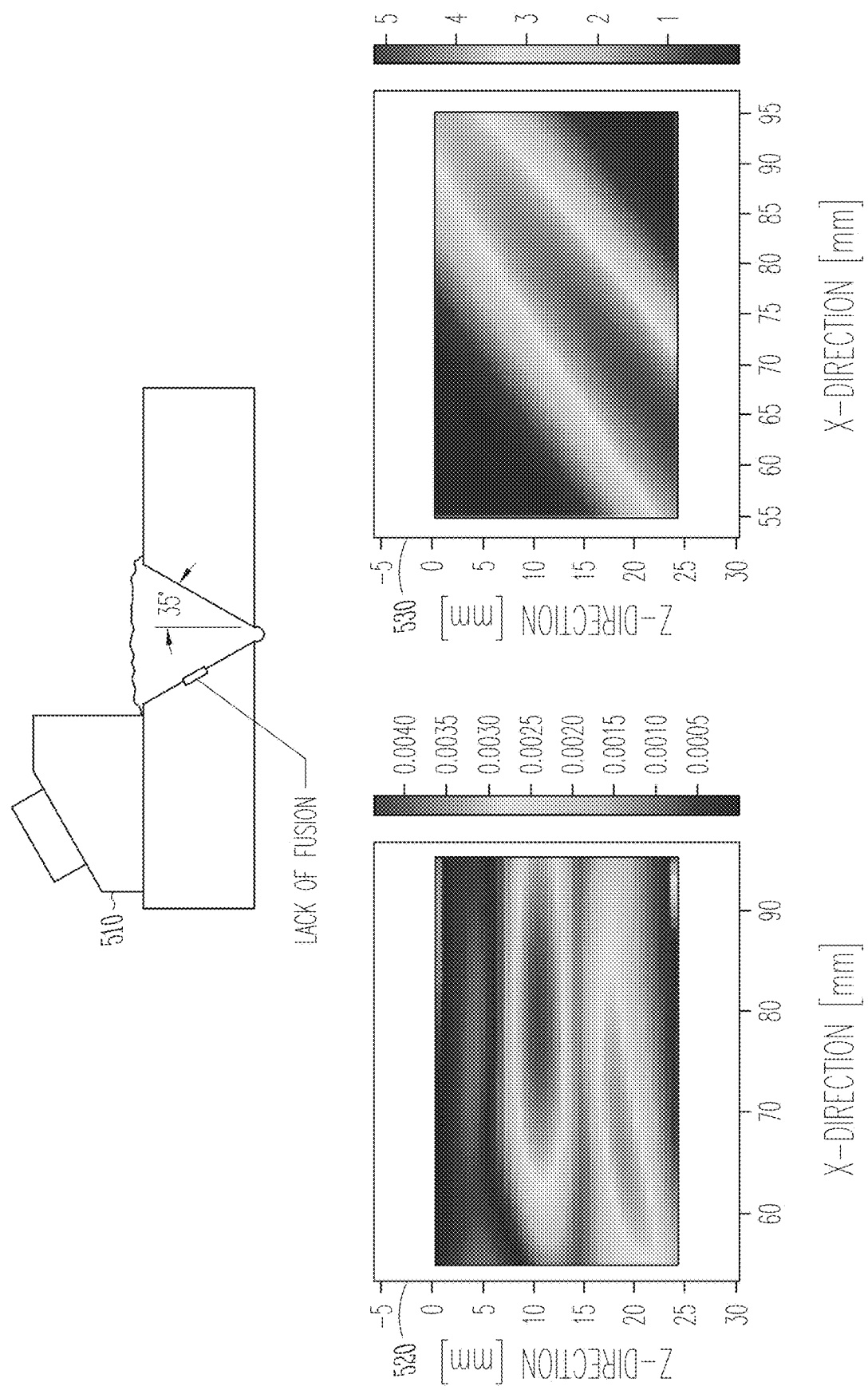
FIG. 5 is an example application of the acoustic model, according to some implementations of the present disclosure.

To further demonstrate the utility of the acoustic model AROI generator 14, an example is shown in FIG. 5 where the simulated output of the acoustic model AROI generator 14 is used to guide selection of the TFM inspection mode. In the example shown in FIG. 5, a V-bevel weld sample 510 with a known lack of fusion defect is provided. The weld angle is approximately 35 degrees and uses a given probe and wedge. The lack of fusion defect is simulated by a 5 mm diameter FBH defect which has a bottom surface oriented at 35 degrees away from the vertical. The corresponding simulated output based on these scan plan parameters (e.g., for self-tandem TLT mode and double-skip TTTT mode) that is generated by acoustic model AROI generator 14 is shown in FIG. 5. Specifically, the simulated output 520 represents the image of the sample 510 based on the input parameters for a self-tandem TLT mode of inspection. The simulated output 530 represents the image of the sample 510 based on the input parameters for a double-skip TTTT mode of inspection. In some cases, the simulated output 520 does not represent the image that would result from an inspection of the specimen with the specified flaw. The simulated output 530 shows the expected flaw amplitude of such a flaw in a specimen for any position in the x and z direction.

A user can analyse these two outputs (side-by-side or one after the other) to determine that the simulated output of the TLT mode is more irregular when compared to the simulated output of the double-skip mode. Consequently, the user can determine that it would be more difficult to obtain a robust assessment of the flaw (e.g., the size of the lack of fusion defect) using the TLT mode. In addition, the expected amplitude from the TLT mode is 3 orders of magnitude lower than the double-skip mode as shown in the outputs 520 and 530. Using these outputs 520 and 530, the user predicts that the double-skip TTTT mode would yield a better result (e.g., an image with higher SNR) during an inspection of the sample 510 than the self-tandem TLT mode.

Figure 6:
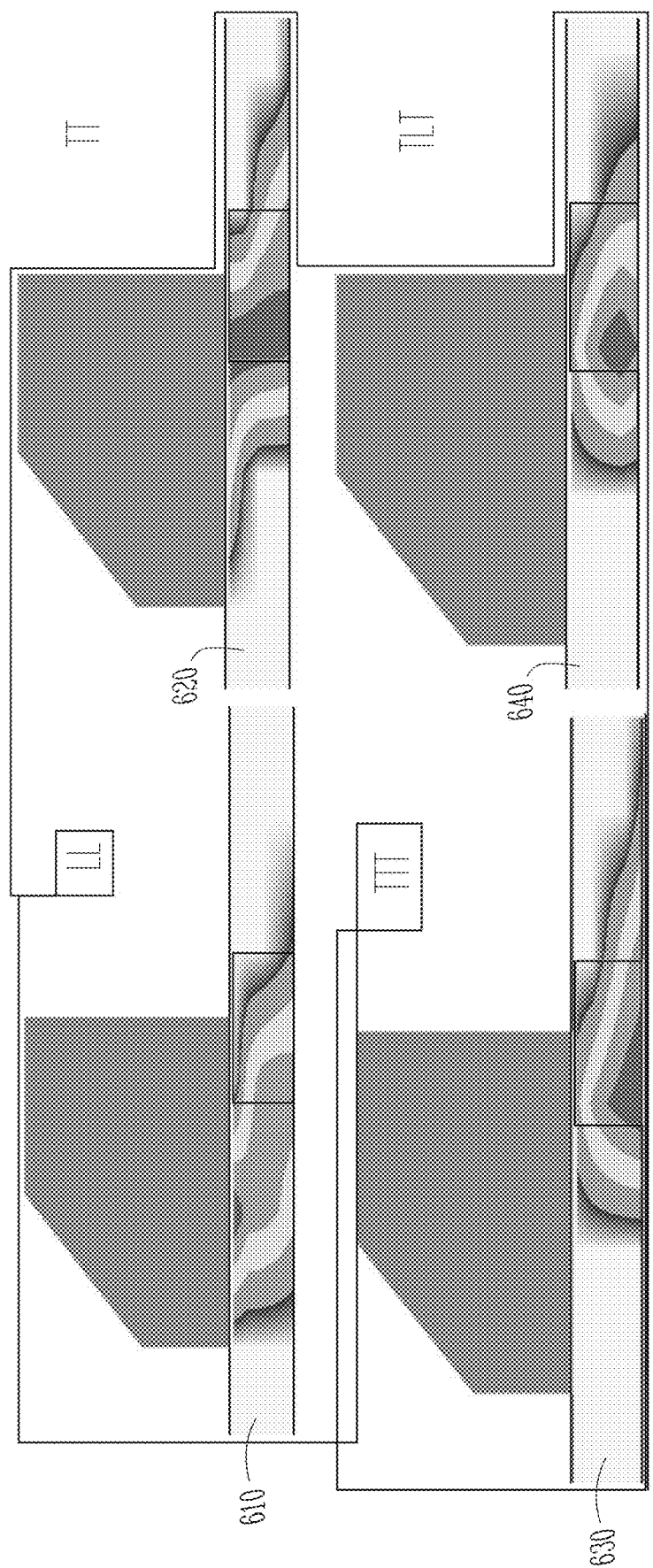
FIG. 6 are illustrative outputs of the acoustic model for various modes, according to some implementations of the present disclosure.

In some implementations, the acoustic model AROI generator 14 provides various simulated images that represent an estimate or prediction of an inspection when performed according to a specific set of scan plan parameters. The map generated by the acoustic model AROI generator 14 represents the acoustic sensitivity of a given acoustic mode (e.g., inspection mode, such as LL) with regard to all necessary or specified parameters (e.g., probe, wedge, flaw types, flaw orientation, etc.). FIG. 6 shows illustrations of the acoustic model AROI generator 14 simulated output for four different acoustic propagation modes LL, TT, TTT and TLT. Specifically, a first image 610 represents a first simulated output of the LL propagation mode, a second image 620 represents a second simulated output of the TT propagation mode, a third image 630 represents a third simulated output of the TTT propagation mode, a fourth image 640 represents a fourth simulated output of the TLT propagation mode. These images may be presented simultaneously (e.g., when an option is input to instruct the acoustic model AROI generator 14 to generate simultaneously two or more different simulated outputs for two or more inspection modes) or sequentially when the user selects a different inspection mode after seeing the results of a particular inspection mode.

In some implementations, the acoustic model AROI generator 14 automatically recommends one or more parameters of a scan plan based on flaw information 120. The flaw information 120 may also be related to the bevel geometry (e.g., flaws may be known to be in specific regions and also flaw orientation may be known to be related to the bevel). The flaw information 120 may include a database that associates a plurality of weld flaws with an expected position in the specimen of each of a plurality of weld flaws. Specifically, the acoustic model AROI generator 14 receives input from a user that defines a flaw and one or more parameters of a scan plan. In some cases, the user does not specify the inspection mode for the scan plan. In response, the acoustic model AROI generator 14 accesses the flaw information 120 to determine a given weld flaw that matches the user defined flaw. The acoustic model AROI generator 14 retrieves from the database the expected position associated with the determined given weld flaw. The acoustic model AROI generator 14 recommends or presents to the user for each of a plurality of inspection modes, one or more parameters to use in a scan plan (e.g., the probe and wedge selection, a probe placement, and/or acoustic parameters). Specifically, the acoustic model AROI generator 14 presents a display that lists various inspection modes and that provides for each inspection mode one or more parameters that are recommended to use for that particular inspection mode. The user can then select the optimal scan plan parameters and inspection mode for performing the inspection.

In this way, the acoustic model AROI generator 14 automatically populates or automatically recommends one or more parameters that are missing from the scan plan, that were not specified by the user, that were requested to be automatically generated by the user, and/or that result in an improved output relative to scan plan parameters input by the user. In some implementations, the acoustic model AROI generator 14 solves an optimization problem according to the inputs provided by the user including optimization goals to automatically recommend the one or more scan plan parameters.

Figure 8:
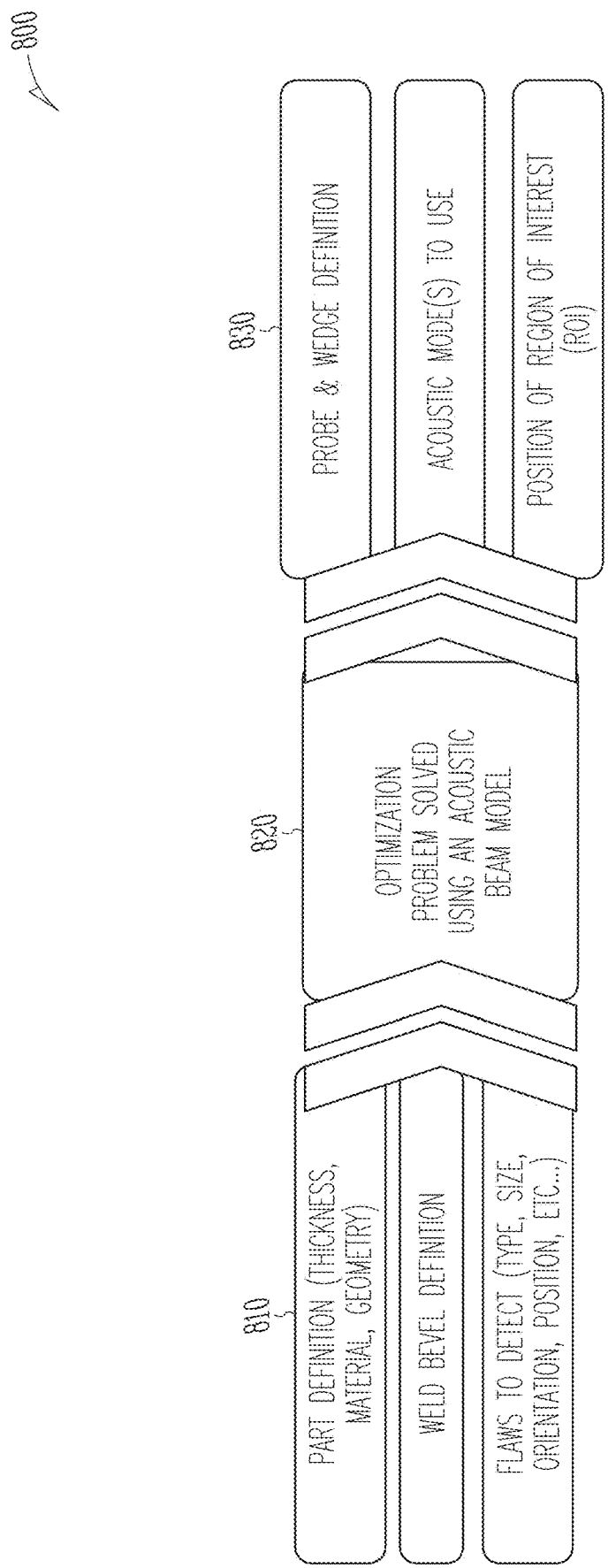
FIGS. 8-11 illustrate a method for conducting a scan plan, according to some implementations of the present disclosure.

For example, as shown in process 800 of FIG. 8, one or more parameters of a scan plan 830 are automatically generated by the acoustic model AROI generator 14 based on solving an optimization problem 820 using parameters 810 input by a user. Specifically, the user can input part definition (e.g., thickness, material, and/or geometry information), weld bevel definition, and flaws to detect (e.g., type, size, orientation, position, and so forth). The acoustic model AROI generator 14 solves the optimization problem 820 based on the parameters 810. The acoustic model AROI generator 14 outputs one or more parameters of a scan plan 830 based on the solution to the optimization problem (e.g., probe and wedge definition, acoustic mode(s) to use, and/or position of the region of interest).

In some implementations, in order to obtain consistent flaw amplitude within a given AROI image output by the AROI generator 14, the acoustic model AROI generator 14 can calibrate the amplitude of the AROI image according to Equation 5:

$$TFM_{calibrated}(x, z) = \frac{TFM(x, z)}{AROI(x, z)} \tag{5}$$

As discussed below, the calibrated image can then be included in a composite multi-mode TFM image 730 or composite coverage map. This ensures that an identical flaw would have consistent echo amplitude irrespective of its location and the number of acoustic modes used to reconstruct the echo.

In order to normalize the composite multi-mode image 730 or composite coverage map, the acoustic model AROI generator 14 uses the following expression defined by Equation 6:

$$TFM_{calibrated}(x, z) = \sum_{m}^{M(x,z)} \frac{TFM_m(x, z)}{AROI_m(x, z)} \quad (6)$$

In the expression, m represents the different acoustic inspection modes and M(x,z) represents the count of acoustic modes used to reconstruct a given pixel.

Figure 7:
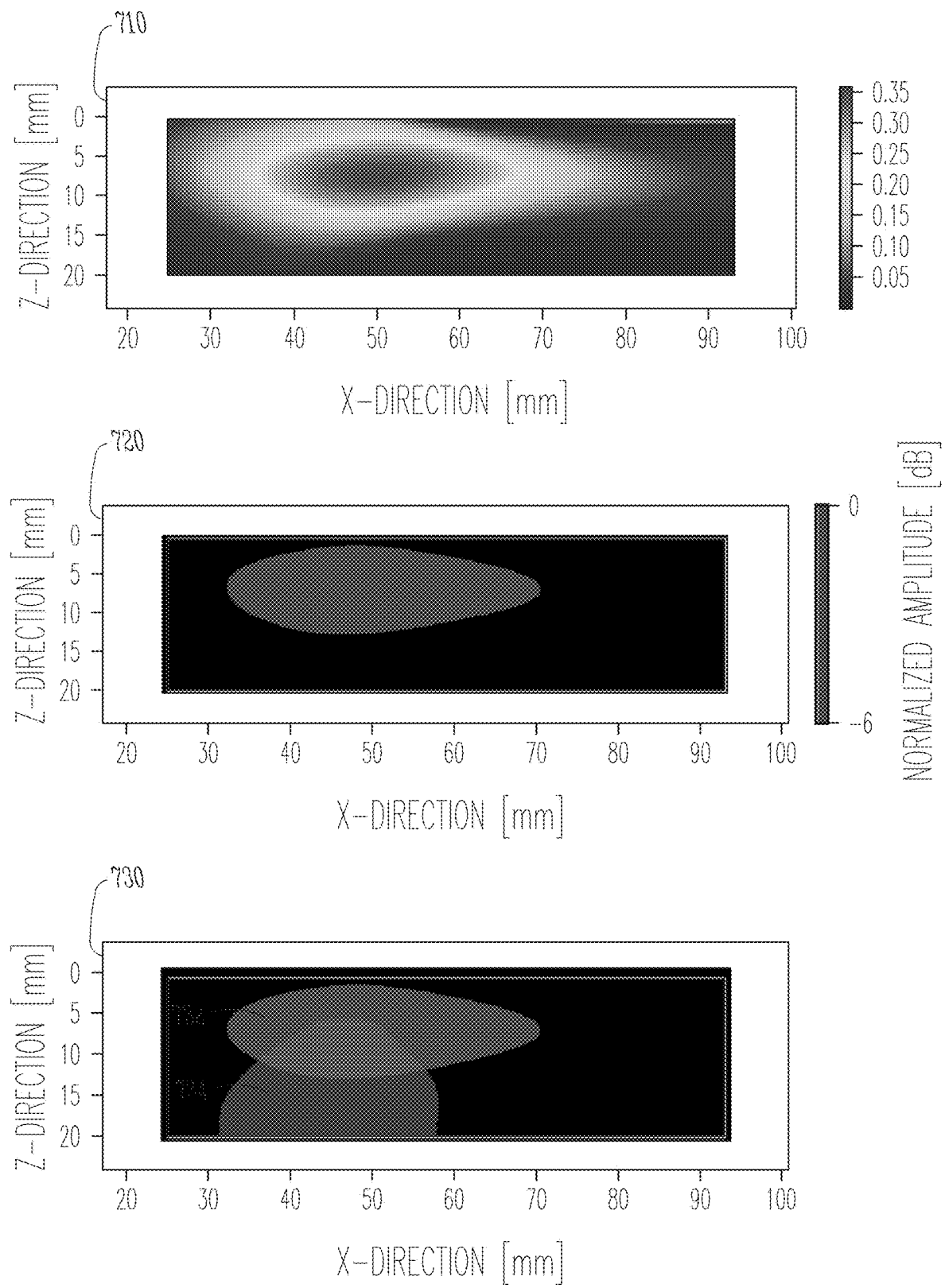
FIG. 7 is an illustrative multi-mode image of the acoustic model, according to some implementations of the present disclosure.

The calibrated or non-calibrated output of the acoustic model AROI generator 14 can be used to generate multi-mode TEM coverage maps (or images), as discussed above. Specifically, for a given acoustic mode, the AROI map can show the locations within the TEM imaging area where one would expect to obtain good SNR. Consequently, a user can use the AROI to intelligently combine a multitude of acoustic modes to obtain good SNR over a large portion of the TFM imaging area. To generate a multi-mode image, a criterium (e.g., a threshold) that defines for a given acoustic mode where the SNR is deemed sufficient is received (e.g., from the user and/or from storage). For example, a −6 dB drop (relative to the maximum amplitude) threshold can be used. As an example, as shown in FIG. 7, the acoustic model AROI generator 14 can obtain a first simulated image 710 corresponding to a first inspection mode (e.g., a self-tandem TLT inspection mode). The acoustic model AROI generator 14 can identify the maximum amplitude in the first simulated image 710 and compare remaining amplitudes that are shown in the first simulated image 710 to obtain a difference. If the difference exceeds the threshold that is provided for the first inspection mode, the acoustic model AROI generator 14 removes that portion from a first multi-mode image 720 that is generated.

The acoustic model AROI generator 14 adds the first multi-mode image 720 to a composite multi-mode image 730 and assigns a given color to the first multi-mode image 720 in the composite multi-mode image 730 (e.g., a composite multi-mode AROI coverage map). The first multi-mode image 720 in the composite multi-mode image 730 represents the coverage of the mode associated with the first multi-mode image 720. Next, the acoustic model AROI generator 14 obtains a second simulated image corresponding to a second inspection mode (e.g., a self-tandem TTT inspection mode). The acoustic model AROI generator 14 can identify the maximum amplitude in the second simulated image and compare remaining amplitudes that are shown in the second simulated image to obtain a difference. The acoustic model AROI generator 14 retrieves the threshold associated with the TTT or second inspection mode (which may be different from the threshold associated with the first inspection mode). If the difference exceeds the threshold that is provided for the second inspection mode, the acoustic model AROI generator 14 removes that portion from a second multi-mode image that is generated. The acoustic model AROI generator 14 adds the second multi-mode image 734 to a composite multi-mode image 730 (or composite multi-mode coverage map) and assigns a second color to the second multi-mode image 734 in the composite multi-mode image 730. The second multi-mode image 734 in the composite multi-mode image 730 represents the coverage of the mode associated with the second multi-mode image 734. Any number of additional multi-mode images can be generated and combined into the composite multi-mode image 730, each being assigned a different color or distinguishing visual attribute in the composite multi-mode image 730. In this way, the composite multi-mode coverage map illustrates the coverage of one mode relative to another mode. Using this multi-mode coverage map, a composite AROI and associated composite TFM imaging (in inspection) can be generated.

A user can identify the area of greatest overlap between the multiple images to select the inspection mode for inclusion in the scan plan parameters. Specifically, by combining multiple cut-off criteria from a plurality of acoustic inspection modes, the acoustic model AROI generator 14 or user can determine which acoustic mode(s) should be used to reconstruct each pixel within a composite multi-mode TFM image. In some cases, the acoustic model AROI generator 14 automatically identifies the area of the composite image with the greatest overlap and identifies which acoustic mode contributes the greatest amount of amplitude to that area. In some cases, the acoustic model AROI generator 14 can then automatically recommend the acoustic mode as a scan plan parameter for a user to use that contributes the greatest amount of amplitude to the area of overlap in the composite image 730. In one example, the maximum value of all the modes within their respective coverage area in the composite coverage map or in their respective coverage maps can be considered for all x and z positions and represented as a single image. In some cases, the respective coverage area of each mode can represent the inspection results by the sum of the contributing modes.

Figure 9:
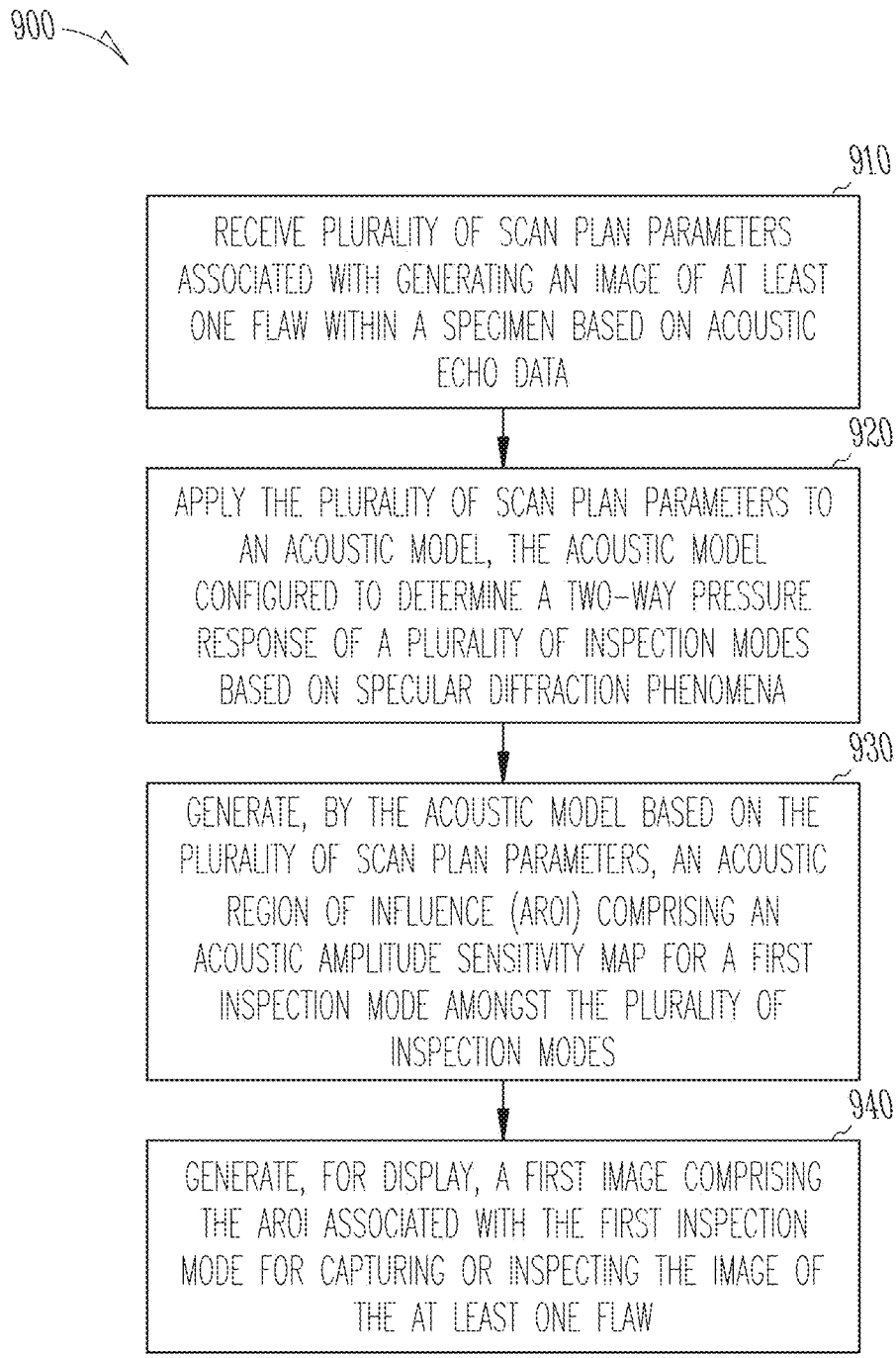

FIG. 9 is a flowchart illustrating example operations of the acoustic model AROI generator 14 in performing process 900, according to example implementations. The process 900 may be embodied in computer-readable instructions for execution by one or more processors such that the operations of the process 900 may be performed in part or in whole by the functional components of the acoustic model AROI generator 14; accordingly, the process 900 is described below by way of example with reference thereto. However, in some implementations, at least some of the operations of the process 900 may be deployed on various other hardware configurations. The process 900 is therefore not intended to be limited to the acoustic model AROI generator 14 and can be implemented in whole, or in part, by any other component. Some or all of the operations of process 900 can be in parallel, out of order, or entirely omitted.

At operation 910, acoustic model AROI generator 14 receives a plurality of scan plan parameters associated with generating an image of at least one flaw within a specimen based on acoustic echo data obtained using full matrix capture.

At operation 920, acoustic model AROI generator 14 applies the plurality of scan plan parameters to an acoustic model, the acoustic model configured to determine a two-way pressure response of a plurality of inspection modes based on specular reflection and diffraction phenomena.

At operation 930, acoustic model AROI generator 14 generates, based on the plurality of scan plan parameters, an AROI comprising an acoustic amplitude sensitivity map for a first inspection mode amongst the plurality of inspection modes.

At operation 940, acoustic model AROI generator 14 generates, for display, a first image comprising the AROI associated with the first inspection mode for capturing or inspecting the image of the at least one flaw.

Figure 10:
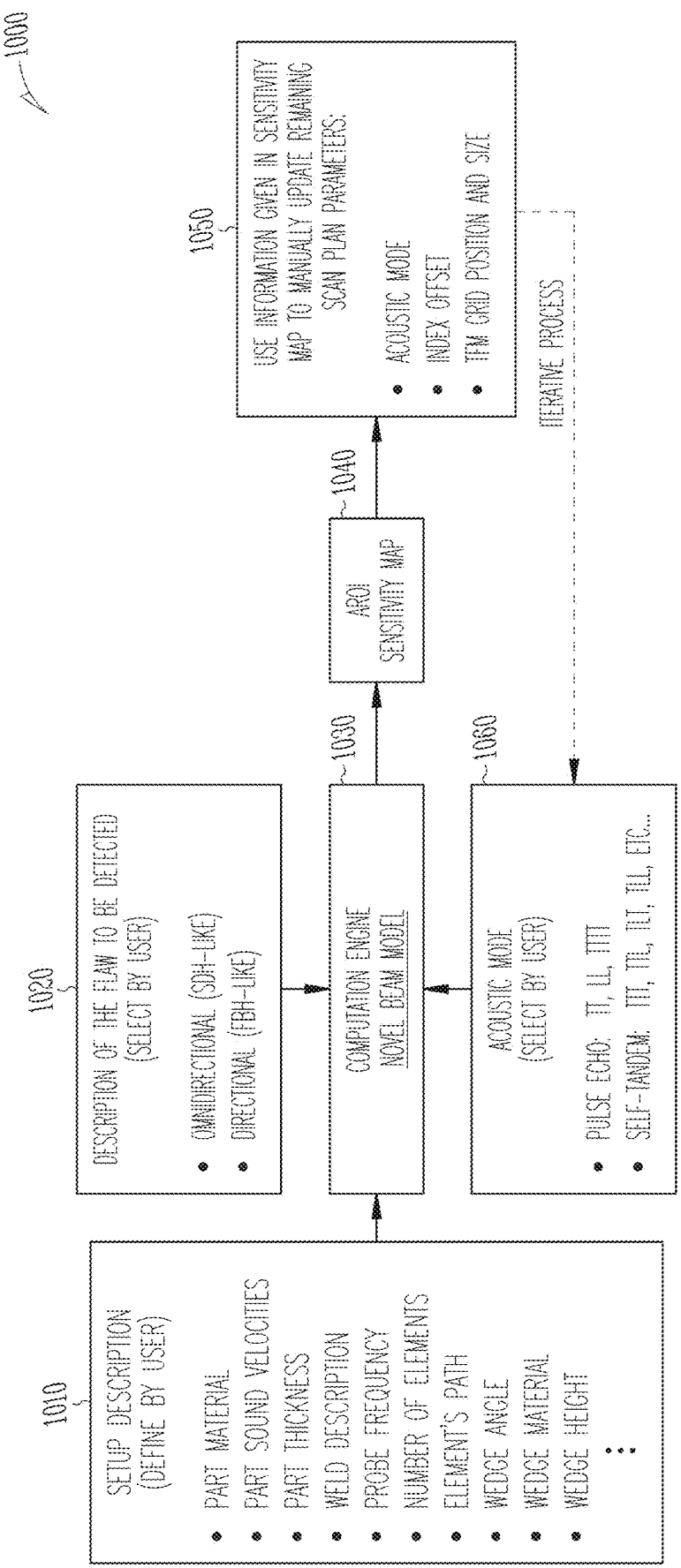

FIG. 10 is a flowchart illustrating example operations of the acoustic model AROI generator 14 in performing process 1000, according to example implementations. The process 1000 may be embodied in computer-readable instructions for execution by one or more processors such that the operations of the process 1000 may be performed in part or in whole by the functional components of the acoustic model AROI generator 14; accordingly, the process 1000 is described below by way of example with reference thereto. However, in some implementations, at least some of the operations of the process 1000 may be deployed on various other hardware configurations. The process 1000 is therefore not intended to be limited to the acoustic model AROI generator 14 and can be implemented in whole, or in part, by any other component. Some or all of the operations of process 1000 can be in parallel, out of order, or entirely omitted.

At operation 1010, acoustic model AROI generator 14 receives user input that includes parameters of a scan plan for a TFM based inspection. For example, the user inputs one or more parameters including part material, part sound velocities, part thickness, weld description, probe frequency, number of elements, element's pitch, wedge angle, wedge material, wedge height, wedge geometry information, and so forth.

At operation 1020, acoustic model AROI generator 14 receives user input that describes a flaw to be detected. For example, the user input can specify an omnidirectional flaw (e.g., side-drill hole flaw) or direction flaw (e.g., a flat bottom hole flaw).

At operation 1060, acoustic model AROI generator 14 receives input from the user of an acoustic inspection mode. For example, the user can select pulse echo inspection mode and a wave set for the mode (e.g., TT, LL or TTTT). In some cases, the user can select the self-tandem inspection mode and a wave set for the mode (e.g., TTT, TTL, TLT, TLL, etc.).

At operation 1030, acoustic model AROI generator 14 applies the inputs received from the user from operations 1010, 1020 and 1060 to an acoustic model.

At operation 1040, acoustic model AROI generator 14 generates an AROI sensitivity map based on the inputs received from the user that are processed by the acoustic model. For example, the AROI generator 14 generates one of the sensitivity maps shown in FIGS. 3-6.

At operation 1050, acoustic model AROI generator 14 presents an image that includes the AROI sensitivity map to a user. For example, the AROI generator 14 displays one of the sensitivity maps shown in FIGS. 3-6. The user can use the information in the displayed map to manually update remaining scan plan parameters and/or adjust parameters that were input, such as the acoustic mode, index offset, and/or the TFM grid position and size. For example, by analysing the image of the AROI sensitivity map, a user can decide that a different inspection mode is more suitable for the flaw of interest. In such cases, the user can select a different inspection mode or can select a different wave set for the currently selected inspection mode. Then, the acoustic model AROI generator 14 generates a new AROI sensitivity map based on the updated parameters of the scan plan for presentation to the user.

Figure 11:
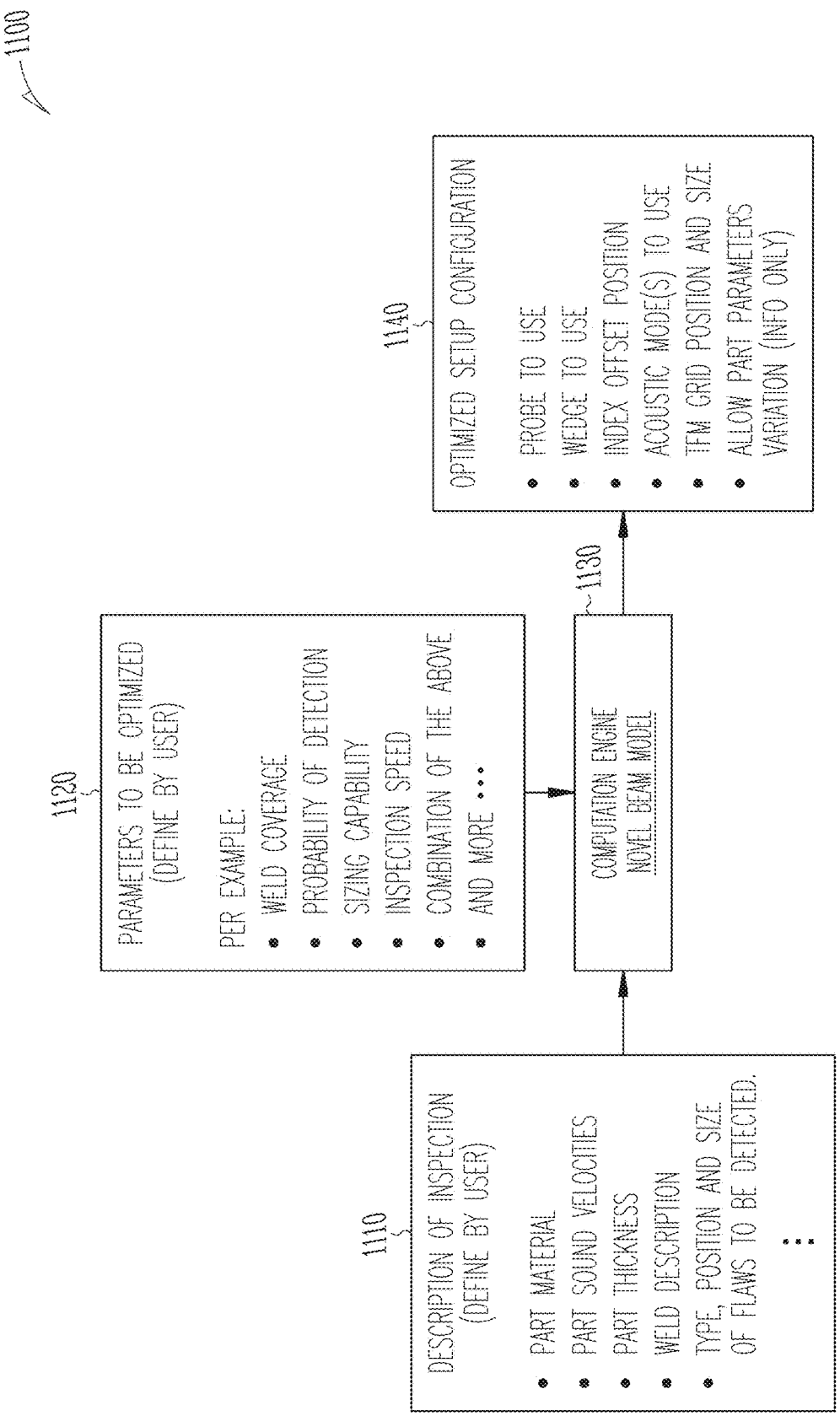

FIG. 11 is a flowchart illustrating example operations of the acoustic model AROI generator 14 in performing process 1100, according to example implementations. The process 1100 may be embodied in computer-readable instructions for execution by one or more processors such that the operations of the process 1100 may be performed in part or in whole by the functional components of the acoustic model AROI generator 14; accordingly, the process 1100 is described below by way of example with reference thereto. However, in some implementations, at least some of the operations of the process 1100 may be deployed on various other hardware configurations. The process 1100 is therefore not intended to be limited to the acoustic model AROI generator 14 and can be implemented in whole, or in part, by any other component. Some or all of the operations of process 1100 can be in parallel, out of order, or entirely omitted.

At operation 1110, acoustic model AROI generator 14 receives user input that includes parameters of a scan plan for a TFM based inspection. For example, the user can input one or more parameters including part material, part sound velocities, part thickness, weld description, type, position and size of the flaws to be detected, and so forth.

At operation 1120, acoustic model AROI generator 14 receives user input that defines parameters of an optimization problem to optimize. For example, the user can input one or more optimization variables including the weld coverage area, probability of detection, sizing capability, inspection speed, and so forth.

At operation 1130, acoustic model AROI generator 14 solves an optimization problem based on the user input received at operations 1110 and 1120 to automatically generate one or more parameters of a scan plan that are output at operation 1140. For example, the parameters that are automatically determined by solving the optimization problem include one or more of probe to use, wedge to use, index offset position, acoustic mode(s) to use, TFM grid position and size, and so forth. In some cases, the acoustic model AROI generator 14 may provide a simulated output of an AROI image that includes a sensitivity map based on the automatically determined parameters of the scan plan. For example, the AROI generator 14 generates one of the sensitivity maps shown in FIGS. 3-6.

As an example, unlike the operations of FIG. 10 where the user inputs the parameters for the inspection mode, in the operations of FIG. 11, the user inputs parameters to optimize and the acoustic model AROI generator 14 automatically suggests or selects the parameters of the scan plan including the inspection mode selection.

Figure 12:
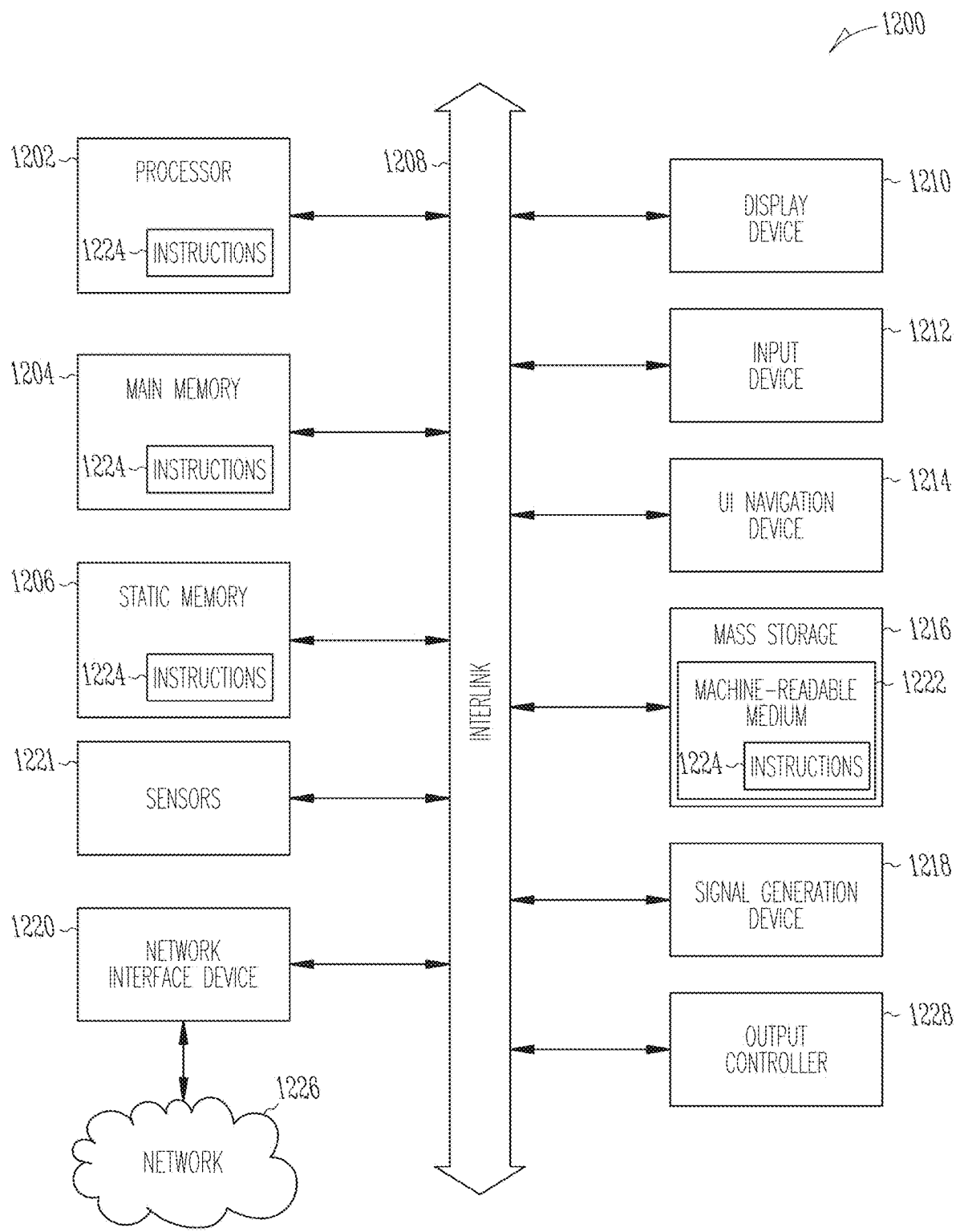
FIG. 12 illustrates an exemplary block diagram of a machine on which one or more of the methods as discussed herein can be implemented.

FIG. 12 illustrates a block diagram of an implementation of a machine 1200 on which one or more of the methods as discussed herein can be implemented. In one or more implementations, one or more items of the image processing device 112 can be implemented by the machine 1200. In one or more implementations, the machine 1200 operates as a standalone device or may be connected (e.g., networked) to other machines. In one or more implementations, the image processing device 112 can include one or more of the items of the machine 1200. In a networked deployment, the machine 1200 may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 1200 includes processing circuitry 1202 (e.g., a CPU, a graphics processing unit (GPU), an ASIC, circuitry, such as one or more transistors, resistors, capacitors, inductors, diodes, logic gates, multiplexers, buffers, modulators, demodulators, radios (e.g., transmit or receive radios or transceivers), sensors 1221 (e.g., a transducer that converts one form of energy (e.g., light, heat, electrical, mechanical, or other energy) to another form of energy), or the like, or a combination thereof), a main memory 1204 and a static memory 1206, which communicate with each other via a bus 1208. The machine 1200 (e.g., computer system) may further include a video display unit 1210 (e.g., a liquid crystal display (LCD) or a cathode ray tube (CRT)). The machine 1200 also includes an alphanumeric input device 1212 (e.g., a keyboard), a user interface (UI) navigation device 1214 (e.g., a mouse), a disk drive or mass storage unit 1216, a signal generation device 1218 (e.g., a speaker), and a network interface device 1220.

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and; or within the processor 1202 during execution thereof by the machine 1200, the main memory 1204 and the processor 1202 also constituting machine-readable media.

The machine 1200 as illustrated includes an output controller 1228. The output controller 1228 manages data flow to/from the machine 1200. The output controller 1228 is sometimes called a device controller, with software that directly interacts with the output controller 1228 being called a device driver.

While the machine-readable medium 1222 is shown in an implementation to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), EEPROM, and flash memory devices; magnetic disks such as internal hard disks and removable disks; magneto-optical disks; and CD-ROM and DVD-ROM disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

As used herein, "communicatively coupled between" means that the entities on either of the coupling must communicate through an item therebetween and that those entities cannot communicate with each other without communicating through the item.

Additional Notes

The above detailed description includes references to the accompanying drawings, which form a part of the detailed description. The drawings show, by way of illustration but not by way of limitation, specific implementations in which the disclosure can be practiced. These implementations are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a," "an," "the," and "said" are used when introducing elements of aspects of the disclosure or in the implementations thereof, as is common in patent documents, to include one or more than one or more of the elements, independent of any other instances or usages of "at least one" or "one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms "comprising" and "wherein." Also, in the following claims, the terms "comprising," "including," and "having" are intended to be open-ended to mean that there may be additional elements other than the listed elements, such that after such a term (e.g., comprising, including, having) in a claim are still deemed to fall within the scope of that claim. Moreover, in the following claims, the terms "first," "second," and "third," and so forth, are used merely as labels, and are not intended to impose numerical requirements on their objects.

Implementations of the disclosure may be implemented with computer-executable instructions. The computer-executable instructions (e.g., software code) may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other implementations of the disclosure may include different computer-executable instructions or components having more or less functionality than illustrated and described herein.

Method examples (e.g., operations and functions) described herein can be machine or computer-implemented at least in part (e.g., implemented as software code or instructions). Some examples can include a computer-readable medium or machine-readable medium encoded with instructions operable to configure an electronic device to perform methods as described in the above examples. An implementation of such methods can include software code, such as microcode, assembly language code, a higher-level language code, or the like (e.g., "source code"). Such software code can include computer readable instructions for performing various methods (e.g., "object" or "executable code"). The software code may form portions of computer program products. Software implementations of the implementations described herein may be provided via an article of manufacture with the code or instructions stored thereon, or via a method of operating a communication interface to send data via a communication interface (e.g., wirelessly, over the internet, via satellite communications, and the like).

Further, the software code may be tangibly stored on one or more volatile or non-volatile computer-readable storage media during execution or at other times. These computer-readable storage media may include any mechanism that stores information in a form accessible by a machine (e.g., computing device, electronic system, and the like), such as, but are not limited to, floppy disks, hard disks, removable magnetic disks, any form of magnetic disk storage media, CD-ROMS, magnetic-optical disks, removable optical disks (e.g., compact disks and digital video disks), flash memory devices, magnetic cassettes, memory cards or sticks (e.g., secure digital cards), RAMs (e.g., CMOS RAM and the like), recordable/non-recordable media (e.g., read only memories (ROMs)), EPROMS, EEPROMS, or any type of media suitable for storing electronic instructions, and the like. Such computer readable storage medium coupled to a computer system bus to be accessible by the processor and other parts of the OIS.

In various implementations of the disclosure, the method of creating a component or module can be implemented in software, hardware, or a combination thereof. The methods provided by various implementations of the present disclosure, for example, can be implemented in software by using standard programming languages such as, for example, C, C++, Java, Python, and the like; and combinations thereof. As used herein, the terms "software" and "firmware" are interchangeable, and include any computer program stored in memory for execution by a computer.

A communication interface includes any mechanism that interfaces to any of a hardwired, wireless, optical, and the like, medium to communicate to another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present disclosure also relates to a system for performing the operations herein. This system may be specially constructed for the required purposes, or it may comprise a general purpose computer selectively activated or reconfigured by a computer program stored in the computer. The order of execution or performance of the operations in implementations of the disclosure illustrated and described herein is not essential, unless otherwise specified. That is, the operations may be performed in any order, unless otherwise specified, and implementations of the disclosure may include additional or fewer operations than those disclosed herein. For example, it is contemplated that executing or performing a particular operation before, contemporaneously with, or after another operation is within the scope of aspects of the disclosure.

In view of the above, it will be seen that the several objects of the disclosure are achieved and other advantageous results attained. Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The above description is intended to be illustrative, and not restrictive. For example, the above-described examples (or one or more aspects thereof) may be used in combination with each other. In addition, many modifications may be made to adapt a particular situation or material to the teachings of the disclosure without departing from its scope. While the dimensions, types of materials and coatings described herein are intended to define the parameters of the disclosure, they are by no means limiting and are exemplary implementations. Many other implementations will be apparent to those of skill in the art upon reviewing the above description. The scope of the disclosure should, therefore, be determined with reference to the appended claims, along with the full scope of equivalents to which such claims are entitled.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description, with each claim standing on its own as a separate implementation. The scope of the disclosure should be determined with reference to the appended claims, along with the full scope of equivalents to which such claims are entitled.

The Abstract is provided to allow the reader to quickly ascertain the nature of the technical disclosure. It is submitted with the understanding that it will not be used to interpret or limit the scope or meaning of the claims.

The invention claimed is:

1. A method for conducting an ultrasonic-based inspection, the method comprising:
receiving, by one or more processors, a plurality of scan plan parameters associated with generating an image of at least one flaw within a specimen based on acoustic echo data;
applying the plurality of scan plan parameters to an acoustic model, the acoustic model configured to determine a two-way pressure response of a plurality of inspection modes based on specular reflection and diffraction phenomena;
generating, by the acoustic model based on the plurality of scan plan parameters, an acoustic region of influence (AROI) comprising an acoustic amplitude sensitivity map for a first inspection mode amongst the plurality of inspection modes; and generating, for display, a first image comprising the AROI associated with the first inspection mode for capturing or inspecting the image of the at least one flaw.

2. The method of claim 1, wherein the acoustic echo data is obtained using full matrix capture (FMC) or phased array inspection, and wherein the plurality of scan plan parameters comprises at least one of:
a type of the flaw;
a spatial extent of the flaw;
a size of a reflector;
a geometry of the reflector;
an orientation of the reflector;
a specimen material;
an acoustic velocity within the specimen;
a specimen thickness;
a weld description comprising a weld bevel angle;
a probe frequency;
a count of elements;
a pitch of acoustic transducer elements;
geometry of acoustic transducer elements;
an acoustic transducer assembly wedge angle;
an acoustic transducer assembly wedge material; or
an acoustic transducer assembly wedge geometry; and
wherein the plurality of inspection modes comprises at least one of pulse echo mode, double-skip mode, or self-tandem mode.

3. The method of claim 1, wherein the acoustic model is based on an adaptation of Fourier optics to acoustic values, wherein the acoustic model produces an amplitude map suitable for predicted amplitude compensation, wherein the AROI differs based on directional and non-directional flaw scatterers, wherein the non-directional flaw scatterers include at least one of slag or porosity in a weld being inspected, and wherein the directional flaw scatterers include at least one of a lack of fusion in the weld being inspected or a crack in the specimen.

4. The method of claim 1, further comprising:
adjusting at least one of the plurality of scan plan parameters based on the generated image; and
performing an inspection of the specimen based on the adjusted plurality of scan plan parameters.

5. The method of claim 4, further comprising:
generating, by the acoustic model based on the adjusted plurality of scan plan parameters, another AROI comprising another acoustic amplitude sensitivity map for the first inspection mode; and
generating, for display, a second image comprising the another AROI prior to performing the inspection.

6. The method of claim 1, further comprising:
selecting a second inspection mode of the plurality of inspection modes; and
generating, by the acoustic model based on the plurality of scan plan parameters, another AROI comprising another acoustic amplitude sensitivity map for the second inspection mode; and
generating, for display, a second image comprising the another AROI prior to performing an inspection of the specimen.

7. The method of claim 1, wherein the acoustic model generates the AROI based on wave propagation information in transmission and reception comprising a transmission coefficient, a reflection coefficient, a geometric beam spread and an acoustic attenuation corresponding to a material of the specimen, wherein the propagation information is generated using paraxial Fourier optics, wherein the acoustic model computes a change in path of an acoustic beam as the beam crosses the specimen and computes a change in amplitude of the acoustic beam using plane-wave transmission/reflection coefficients, and wherein the acoustic model generates the AROI further based on flaw scattering information comprising diffraction or specular reflection-like responses.

8. The method of claim 1, further comprising determining an area within the scan plan indicative of enhanced sensitivity.

9. The method of claim 1, further comprising comparing outputs of the acoustic model for at least one of: different scan plan parameters or different inspection modes.

10. The method of claim 1, wherein the first image represents a flat bottom hole flaw or a side-drilled hole flaw.

11. The method of claim 1, further comprising:
performing an inspection of the specimen based on the plurality of scan plan parameters using a portable instrument; and
displaying the first image on the portable instrument before, during or after performing the inspection.

12. The method of claim 11, further comprising adjusting at least one parameter amongst the plurality of scan plan parameters, based on the displayed first image, while performing the inspection.

13. The method of claim 1, wherein the AROI is generated based on at least one of a flaw characteristic or a reflector characteristic, and the plurality of scan plan parameters.

14. The method of claim 1, further comprising:
generating an inspection image based on performing an inspection of the specimen according to the plurality of scan plan parameters; and
comparing the inspection image with the first image that is generated for display.

15. The method of claim 1, wherein the image of at least one flaw is generated using a Total Focusing Method (TFM), further comprising:
automatically adjusting at least one parameter amongst the plurality of scan plan parameters of the TFM based on the AROI by solving an optimization problem.

16. The method of claim 15, further comprising:
accessing a database that associates a plurality of weld flaws with an expected position in the specimen of each of the plurality of weld flaws;
determining a given weld flaw of the plurality of weld flaws based on one or more parameters of the plurality of scan plan parameters; and
processing the expected position associated with the given weld flaw using the acoustic model to recommend, for each of the plurality of inspection modes, at least one of a probe and wedge selection, a probe placement, or acoustic parameters.

17. The method of claim 1, further comprising:
receiving an inspection image based on performing an inspection of the specimen according to the plurality of scan plan parameters; and
adjusting amplitude compensation in the inspection image based on the AROI, wherein the ARM provides an adjustment map for adjusting the inspection image.

18. The method of claim 1, further comprising:
retrieving an amplitude threshold;
generating a first multi-mode image by removing portions of the first image that have intensity amplitudes that fall below the amplitude threshold;
generating, by the acoustic model based on the plurality of scan plan parameters, another acoustic region of influence (AROI) comprising another acoustic amplitude sensitivity map for a second inspection mode amongst the plurality of inspection modes;

generating, for display, a second image comprising the AROI associated with the second inspection mode;

generating a second multi-mode image by removing portions of the second image that have intensity amplitudes that fall below the amplitude threshold; and combining the first multi-mode image and the second multi-mode image into a composite multi-mode image, wherein the first multi-mode image is visually distinguished from the second multi-mode image in the composite multi-mode image.

19. The method of claim 18, further comprising normalizing intensity amplitudes of the first multi-mode image and the second multi-mode image before combining the first multi-mode image and the second multi-mode into the composite multi-mode image.

20. The method of claim 18, further comprising repeating the generating of a multi-mode image operation and the combining for one or more additional images comprising the AROI associated with one or more additional respective inspection modes.

21. A system for conducting an ultrasonic-based inspection, the system comprising:

one or more processors configured to perform operations comprising:

receiving a plurality of scan plan parameters associated with generating an image of at least one flaw within a specimen based on acoustic echo data obtained using full matrix capture (FMC);

applying the plurality of scan plan parameters to an acoustic model, the acoustic model configured to determine a two-way pressure response of a plurality of inspection modes based on specular reflection and diffraction phenomena;

generating, by the acoustic model based on the plurality of scan plan parameters, an acoustic region of influence (AROI) comprising an acoustic amplitude sensitivity map for a first inspection mode amongst the plurality of inspection modes; and generating, for display, a first image comprising the AROI associated with the first inspection mode for capturing or inspecting the image of the at least one flaw.

22. A non-transitory computer-readable medium comprising non-transitory computer-readable instructions that, when executed by one or more processors, cause the one or more processors to perform operations comprising:

receiving a plurality of scan plan parameters associated with generating an image of at least one flaw within a specimen based on acoustic echo data obtained using full matrix capture (FMC);

applying the plurality of scan plan parameters to an acoustic model, the acoustic model configured to determine a two-way pressure response of a plurality of inspection modes based on specular reflection and diffraction phenomena;

generating, by the acoustic model based on the plurality of scan plan parameters, an acoustic region of influence (AROI) comprising an acoustic amplitude sensitivity map for a first inspection mode amongst the plurality of inspection modes; and generating, for display, a first image comprising the AROI associated with the first inspection mode for capturing or inspecting the image of the at least one flaw.

* * * * *

UNITED STATES PATENT AND TRADEMARK OFFICE
CERTIFICATE OF CORRECTION

PATENT NO. : 11,474,076 B2
APPLICATION NO. : 16/799022
DATED : October 18, 2022
INVENTOR(S) : Kwan et al.

Page 1 of 1

It is certified that error appears in the above-identified patent and that said Letters Patent is hereby corrected as shown below:

In the Claims

In Column 20, Line 59, in Claim 17, delete "ARM" and insert --AROI-- therefor

Signed and Sealed this
Twenty-second Day of August, 2023

Katherine Kelly Vidal
Director of the United States Patent and Trademark Office